US012809227B2

(12) United States Patent
Vodopyanov

(10) Patent No.: US 12,809,227 B2
(45) Date of Patent: Nov. 24, 2026

(54) OPTICAL AMPLIFIER SYSTEMS AND METHODS

(71) Applicant: University of Central Florida Research Foundation, Inc., Orlando, FL (US)

(72) Inventor: Konstantin Vodopyanov, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 449 days.

(21) Appl. No.: 18/411,183

(22) Filed: Jan. 12, 2024

(65) Prior Publication Data

US 2024/0255830 A1 Aug. 1, 2024

Related U.S. Application Data

(60) Provisional application No. 63/522,825, filed on Jun. 23, 2023, provisional application No. 63/442,574, filed on Feb. 1, 2023.

(51) Int. Cl.
*G02F 1/39* (2006.01)

(52) U.S. Cl.
CPC ................ *G02F 1/392* (2021.01); *G02F 1/39* (2013.01)

(58) Field of Classification Search
CPC ........... G02F 1/39; G02F 1/392; H01S 3/1083
See application file for complete search history.

(56) References Cited

U.S. PATENT DOCUMENTS 8,384,990 B2 2/2013 Vodopyanov et al.
9,065,243 B2 * 6/2015 Asobe .................. G02F 1/3532
(Continued)

OTHER PUBLICATIONS

Lin et al. ("Optical parametric amplification of sub-cycle shortwave infrared pulses", Nature Communications, 3413 (2020). https://doi.org/10.1038/s41467-020-17247-9, Published Jul. 8, 2020.) (Year: 2020).*
(Continued)

*Primary Examiner* — Michelle R Connelly
(74) *Attorney, Agent, or Firm* — Troutman Pepper Locke LLP; Joshua L. Jones

(57) ABSTRACT

A system can include a beamsplitter configured to be in optical communication with an optical input source configured to generate one or more input optical signals. The beamsplitter can be configured to split the one or more input optical signals into one or more seed optical signals configured to propagate along a first optical path, and one or more pump optical signals configured to propagate along a second optical path. The system can include a frequency divider in optical communication with the beamsplitter to receive the one or more seed optical signals. The frequency divider can be configured to divide optical frequencies of the one or more seed optical signals in half to provide one or more subharmonic seed optical signals. The system can include a beam combiner in optical communication with the frequency divider to receive the one or more subharmonic seed optical signals, and with the beamsplitter to receive the one or more pump optical signals. The beam combiner can be configured to combine at least one of the one or more pump optical signals and at least one of the one or more subharmonic seed optical signals to provide a combined optical signal. The system can include a nonlinear material in optical communication with the beam combiner to receive the combined optical signal. The nonlinear material can be
(Continued)

100 configured to provide optical parametric amplification of the at least one of the one or more subharmonic seed optical signals of the combined optical signal.

20 Claims, 7 Drawing Sheets

(56) References Cited

U.S. PATENT DOCUMENTS

| | | | | |
|---|---|---|---|---|
| 10,191,354 | B1 * | 1/2019 | Qian | H01S 3/10023 |
| 11,579,512 | B2 * | 2/2023 | Gottschall | H01S 3/1305 |
| 2003/0128423 | A1 * | 7/2003 | Jovanovic | G02F 1/39<br>359/349 |
| 2017/0082546 | A1 * | 3/2017 | Dake | G02B 21/0076 |

OTHER PUBLICATIONS

Marandi et al., "Coherence Properties of a Broadband Femtosecond Mid-IR Optical Parametric Oscillator Operating at Degeneracy", 2012 Optical Society of America, Published Mar. 14, 2021-Mar. 26, 2012 / vol. 20, No. 7 / Optics Express / pp. 7255-7262.

K.L. Vodopyanov, "Ultra-Broadband Mid-Infrared Frequency Combs Produced by Optical Subharmonic Generation", Nonlinear Optics—Kvantovaya Elektronika and IOP Publishing Limited—Quantum Electronics 52 (4), pp. 307-312 (2022)—https://doi.org/10.1070/QLE18012.

P.B. Carkum et al., "Attosecond Science", National Research Council of Canada, Ottawa, Ontario, Canada K1A 0R6; Department für Physik, Ludwig-Maximilians-Universität, Am Coulombwall 1, D-85748 Garching, Germany—Max-Planck-Institut für Quantenoptik, Hans-Kopfermann-Strasse 1, D-85748 Garching, Germany—Nature Physics, vol. 3, Jun. 2007—Nature Publishing Group, pp. 381-387—www.nature.com/naturephysics.

Giulio Cerullo et al., "Ultrafast Optical Parametric Amplifiers", Istituto Nazionale per la Fisica della Materia, IFN-CNR, Dipartimento di Fisica, Politecnico, I-20133 Milano, Italy—Review of Scientific Instruments 74, 1 (2003) American Institute of Physics, Published Online: Jan. 16, 2003.

Audrius Dubietis et al., "Trends in Chirped Pulse Optical Parametric Amplification", IEEE Journal of Selected Topics in Quantum Electronics, vol. 12, No. 2—Mar./Apr. 2006, pp. 163-172.

U. Elu et al., "Table-Top High-energy 7 mm OPCPA and 260 mJ Ho:YLF Pump Laser", 0146-9592/19/133194-04 Journal, 2019 Optical Society of America, Optics Letters vol. 44, No. 13 / Jul. 1, 2029, pp. 3194-3197.

* cited by examiner

100

OPTICAL AMPLIFIER SYSTEMS AND METHODS

CROSS-REFERENCE TO RELATED APPLICATIONS

This application claims priority to and the benefit of U.S. Provisional Application No. 63/442,574, filed Feb. 1, 2023, and U.S. Provisional Application No. 63/522,825, filed Jun. 23, 2023, the entire contents of each are herein incorporated by reference in their entirety.

FIELD

This disclosure relates to optics, e.g., to optical amplifiers.

BACKGROUND

Ultrashort pulses of coherent mid-infrared (MIR) laser radiation are playing an increasingly important role in many new areas, such as high-field physics, attosecond science, producing coherent x-rays via high harmonic generation in noble gases and most recently in solids, and table-top laser-driven particle accelerators. These applications require intense (e.g., 1 to 10 GW) to super-intense (e.g., 10 GW to 1 PW) peak power pulses in the difficult-to-achieve long-wavelength (e.g., $\lambda>4$ μm) MIR spectral range. To achieve these high peak powers, ultrafast (e.g., 10 to 500 fs duration) pulses may be used with pulse energies from millijoules to Joules.

One prevailing technique for producing intense ultrafast long-wavelength MIR pulses so far is frequency down conversion from well-developed near-IR laser outputs (e.g., at typically 0.8-2 μm wavelength) using optical parametric amplifiers (OPAs) for moderate (mJ) pulse energies or its variant, a chirped pulse OPA (OPCPA) approach for the generation of higher powers and/or peak intensities. However, the typical conversion efficiency of such OPA/OPCPA devices is low (e.g., <1%), which necessitates building large, expensive, and complicated laser setups.

Such conventional methods and systems have generally been considered satisfactory for their intended purpose. However, there is still a need in the art for improvements. This disclosure provides a solution for this need.

SUMMARY

A system can include a beamsplitter configured to be in optical communication with an optical input source configured to generate one or more input optical signals. The beamsplitter can be configured to split the one or more input optical signals into one or more seed optical signals configured to propagate along a first optical path, and one or more pump optical signals configured to propagate along a second optical path. The system can include a frequency divider in optical communication with the beamsplitter to receive the one or more seed optical signals. The frequency divider can be configured to divide optical frequencies of the one or more seed optical signals in half to provide one or more subharmonic seed optical signals.

The system can include a beam combiner in optical communication with the frequency divider to receive the one or more subharmonic seed optical signals, and with the beamsplitter to receive the one or more pump optical signals. The beam combiner can be configured to combine at least one of the one or more pump optical signals and at least one of the one or more subharmonic seed optical signals to provide a combined optical signal. The system can include a nonlinear material in optical communication with the beam combiner to receive the combined optical signal. The nonlinear material can be configured to provide optical parametric amplification of the at least one of the one or more subharmonic seed optical signals of the combined optical signal.

In certain embodiments, the frequency divider can be or includes a subharmonic optical parametric oscillator configured to output the one or more seed subharmonic optical signals. In certain embodiments, the input optical source can be or include a femtosecond laser oscillator.

In certain embodiments, the system can include an amplifier in optical communication with the beamsplitter to receive the one or more pump optical signals and configured to amplify the one or more pump optical signals upstream of the beam combiner. In certain embodiments, the amplifier can be or include an optical parametric chirped-pulse amplifier (OPCPA).

In certain embodiments, the system can include a pulse picker between the beamsplitter and the amplifier. The pulse picker can be configured to select at least one of the one or more pump optical signals for amplification.

In certain embodiments, the frequency divider can be or include a subharmonic optical parametric generator (OPG) to provide the one or more seed subharmonic optical signals. In certain embodiments, the input optical source can be or include a femtosecond laser amplifier with carrier envelope phase (CEP) stabilization. In certain embodiments, the system can include a chirped pulse amplifier between the input optical source and the beamsplitter such that the one or more input optical signals are chirped upstream of the beamsplitter.

In certain embodiments, the nonlinear material is or includes a nonlinear crystal. In certain embodiments, the nonlinear material can be or include at least one of a periodically-poled oxide, a birefringent crystal, an orientation-patterned cubic crystal, or an orientation-patterned hexagonal crystal.

In certain embodiments, the system can include the input optical source. In certain embodiments, the input optical source is a laser source configured to output laser light. In certain embodiments, the system can include an amplifier upstream of the beamsplitter and configured to amplify the one or more input optical signals.

In accordance with at least one aspect of this disclosure, a method can include splitting one or more input optical signals of laser light into one or more seed optical signals propagating along a first path and one or more pump optical signals propagating along a second path, dividing optical frequencies of the one or more seed optical signals in half to provide one or more subharmonic seed optical signals, and combining at least one of the one or more pump optical signals and at least one of the one or more subharmonic seed optical signals in a nonlinear crystal. The nonlinear crystal can provide optical parametric amplification of the at least one of the one or more subharmonic seed optical signals.

In certain embodiments, dividing can include dividing the optical frequencies with a subharmonic optical parametric oscillator. In certain embodiments, the method can include amplifying the at least one of the one or more pump optical signals upstream of the beam combiner. In certain embodiments, amplifying can include amplifying the at least one of the one or more pump optical signals upstream of the beam combiner with an optical parametric chirped-pulse amplifier (OPCPA). In certain embodiments, dividing can include dividing the optical frequencies of the one or more seed optical signals with an additional nonlinear crystal configured as a subharmonic optical parametric generator. In certain embodiments, the method can further include chirping the one or more input optical signals and/or amplifying the one or more input optical signals upstream of the beamsplitter.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
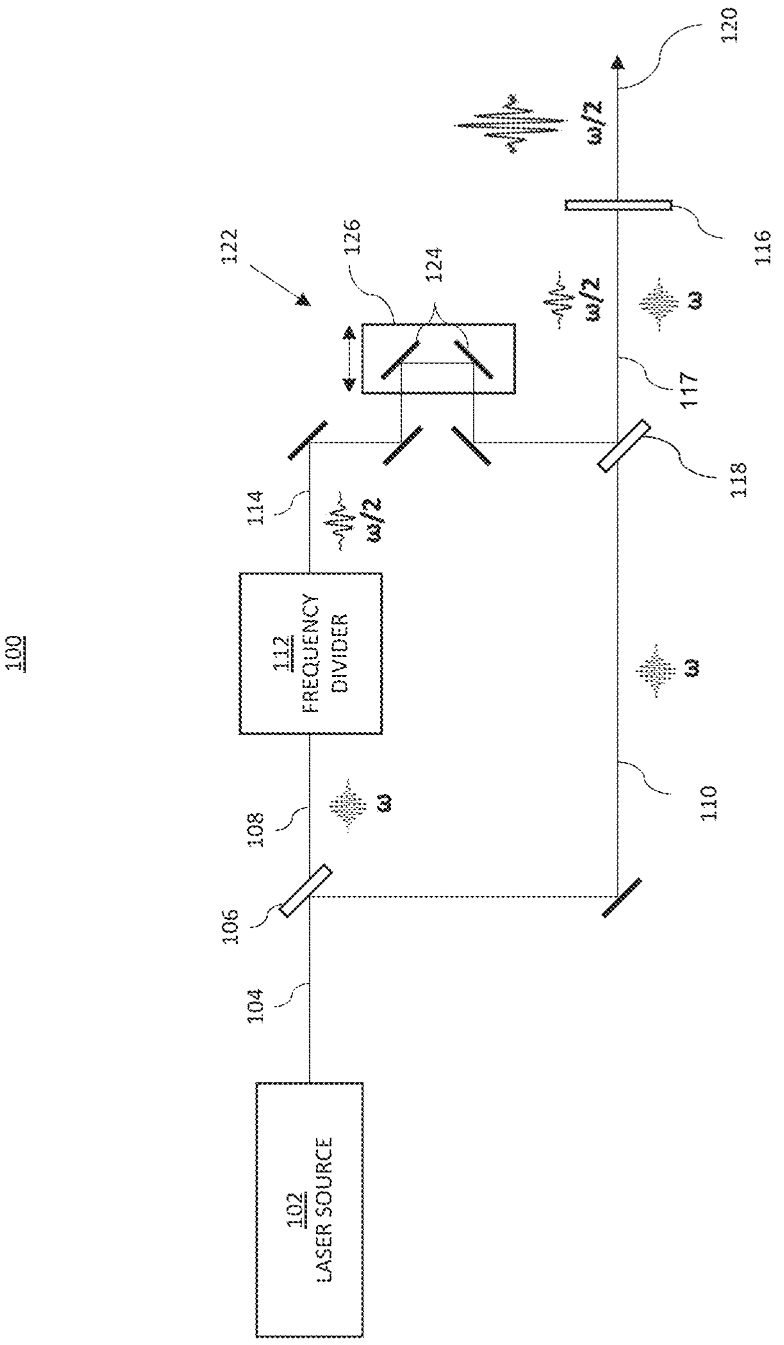
FIG. 1A is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1A and is designated generally by reference character 100. Other views, embodiments, and/or aspects of this disclosure are illustrated in FIGS. 1B-3.

In accordance with at least one aspect of this disclosure, referring to FIG. 1A, a system 100 can include a beamsplitter 106 configured to be in optical communication with an optical input source 102 (e.g., a laser source as shown in FIG. 1A) configured to generate one or more input optical signals 104 (e.g., continuous or pulsed, such as one or more laser light pulses or continuous beams). The beamsplitter 106 can be configured to split the one or more input optical signals 104 into one or more seed optical signals 108 configured to propagate along a first optical path, and one or more pump optical signals 110 configured to propagate along a second optical path.

The system 100 can include a frequency divider 112 (e.g., disposed on the first optical path) in optical communication with the beamsplitter 106 (e.g., directly as shown or indirectly) to receive the one or more seed optical signals 108. The frequency divider 112 can be configured to divide optical frequencies of the one or more seed optical signals 108 in half to provide one or more subharmonic seed optical signals 114.

The system 100 can include a beam combiner 118 in optical communication with the frequency divider 112 (e.g., directly or indirectly as shown) to receive the one or more subharmonic seed optical signals 114, and with the beamsplitter 106 to receive the one or more pump optical signals 110. The beam combiner 118 can be configured to combine at least one of the one or more pump optical signals 110 and at least one of the one or more subharmonic seed optical signals 114 to provide a combined optical signal 117.

The system 100 can include a delay assembly 122 configured to delay the one or more subharmonic seed optical signals 114 to cause the one or more subharmonic seed optical signals 114 to have a desired arrival time at the beam combiner 118 relative to the one or more pump seed signals 110. In certain embodiments, the delay assembly 122 (e.g., a delay line) can include one or more mirrors 124, e.g., located on a translation stage 126 (e.g., a piezoelectric actuator or any other suitable translation stage). Any suitable number of mirrors 124 or other components, and/or any other suitable configuration of components to cause a desired delay of the one or more subharmonic seed optical signals 114 are contemplated herein.

The system 100 can include a nonlinear material 116 in optical communication with the beam combiner 118 to receive the combined optical signal 117. The nonlinear material 116 can be configured to provide optical parametric amplification of the at least one of the one or more subharmonic seed optical signals 114 of the combined optical signal 117. The nonlinear material 116 can be configured to output an amplified output signal 120 (e.g., amplified output pulses).

Figure 1B:
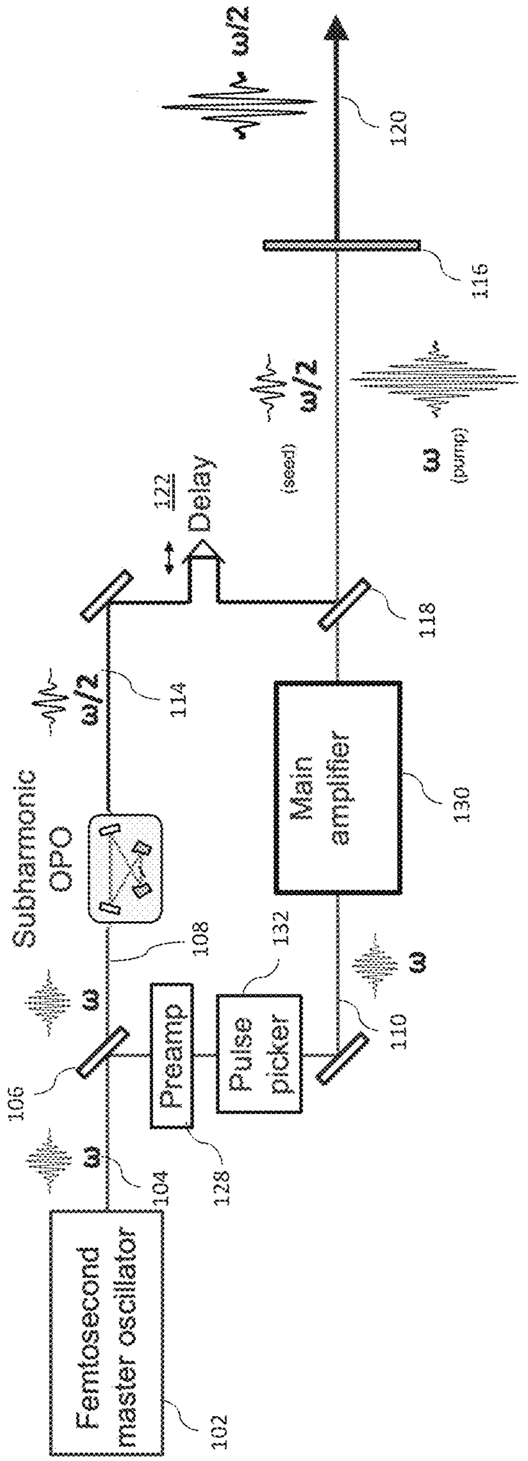
FIG. 1B is a schematic diagram of an embodiment of a system in accordance with this disclosure.

In certain embodiments, referring to FIG. 1B, the frequency divider 112 can be or include a subharmonic optical parametric oscillator configured to output the one or more seed subharmonic optical signals 114. In certain embodiments, e.g., as shown in FIG. 1B, the input optical source 102 can be or include a femtosecond laser oscillator.

In certain embodiments, e.g., as shown in FIG. 1B, the system 100 can include an amplifier 130 in optical communication with the beamsplitter 106 (e.g., directly or indirectly as shown in FIG. 1B) to receive the one or more pump optical signals 110. The amplifier 130 can be configured to amplify the one or more pump optical signals 110 upstream of the beam combiner 118. In certain embodiments, the amplifier 130 can be or include an optical parametric chirped-pulse amplifier (OPCPA).

In certain embodiments, e.g., as shown in FIG. 1B, the system 100 can include a pulse picker 132 between the beamsplitter 106 and the amplifier 130. The pulse picker 132 can be configured to select at least one of the one or more pump optical signals 110 for amplification. The system 100 can also include a preamp 128 between the beamsplitter 106 and the pulse picker 132 and configured to pre-amplify the one or more pump optical signals 110 upstream of the pulse picker 132.

As shown in FIG. 1B, the input can be a sequence of pulses, and the pulse picker 132 can select the pulse of interest. The frequency divider 112 in FIG. 1B can be a resonator that handles several pulses.

Figure 1C:
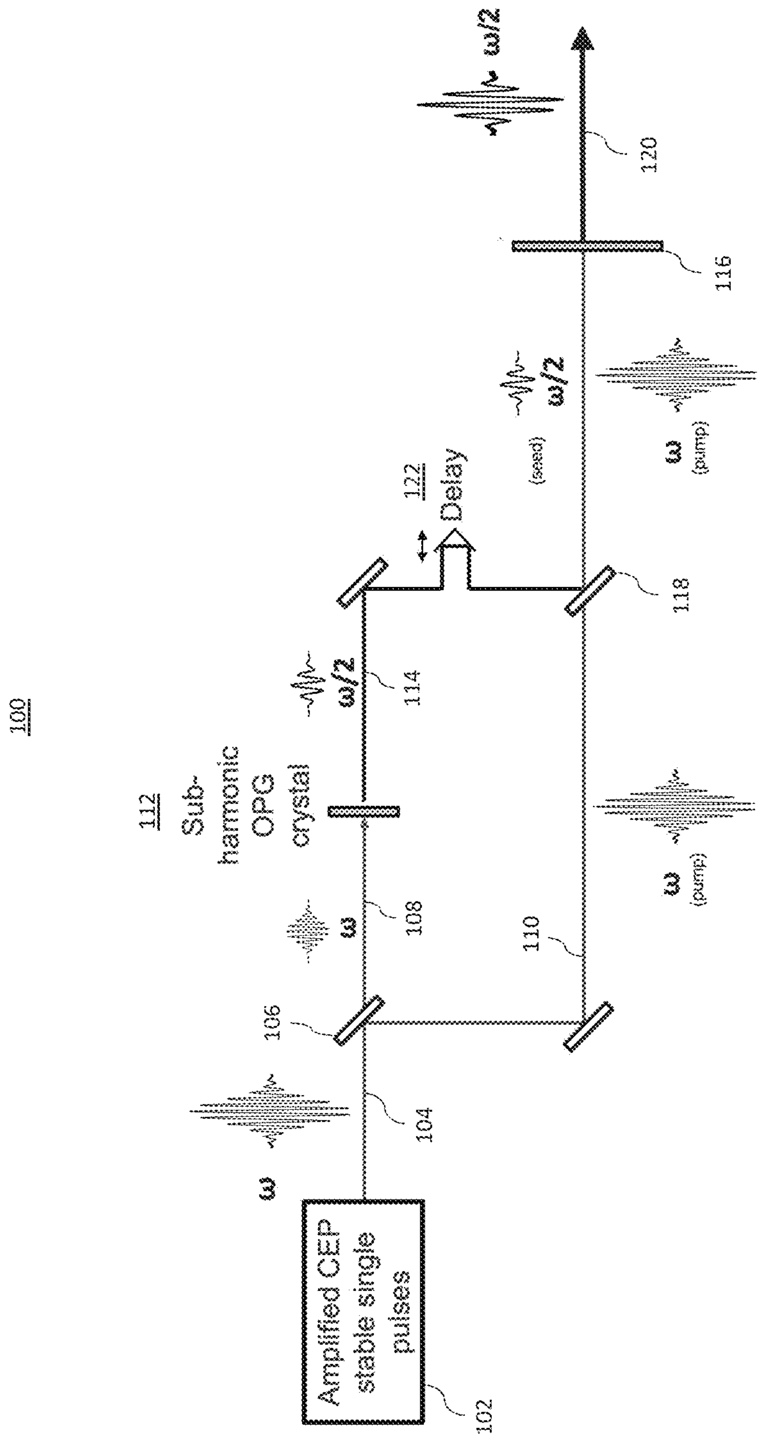
FIG. 1C is a schematic diagram of an embodiment of a system in accordance with this disclosure.

In certain embodiments, referring to FIG. 1C, the frequency divider 112 can be or include a subharmonic optical parametric generator (OPG) to provide the one or more seed subharmonic optical signals 114. In certain embodiments, the input optical source 102 can be or include a femtosecond laser amplifier with carrier envelope phase (CEP) stabilization. The embodiment of a system 100 as shown in FIG. 1C can use a crystal that produces the divided seed optical signal, which can produce a lower quality signal than other methods.

Figure 1D:
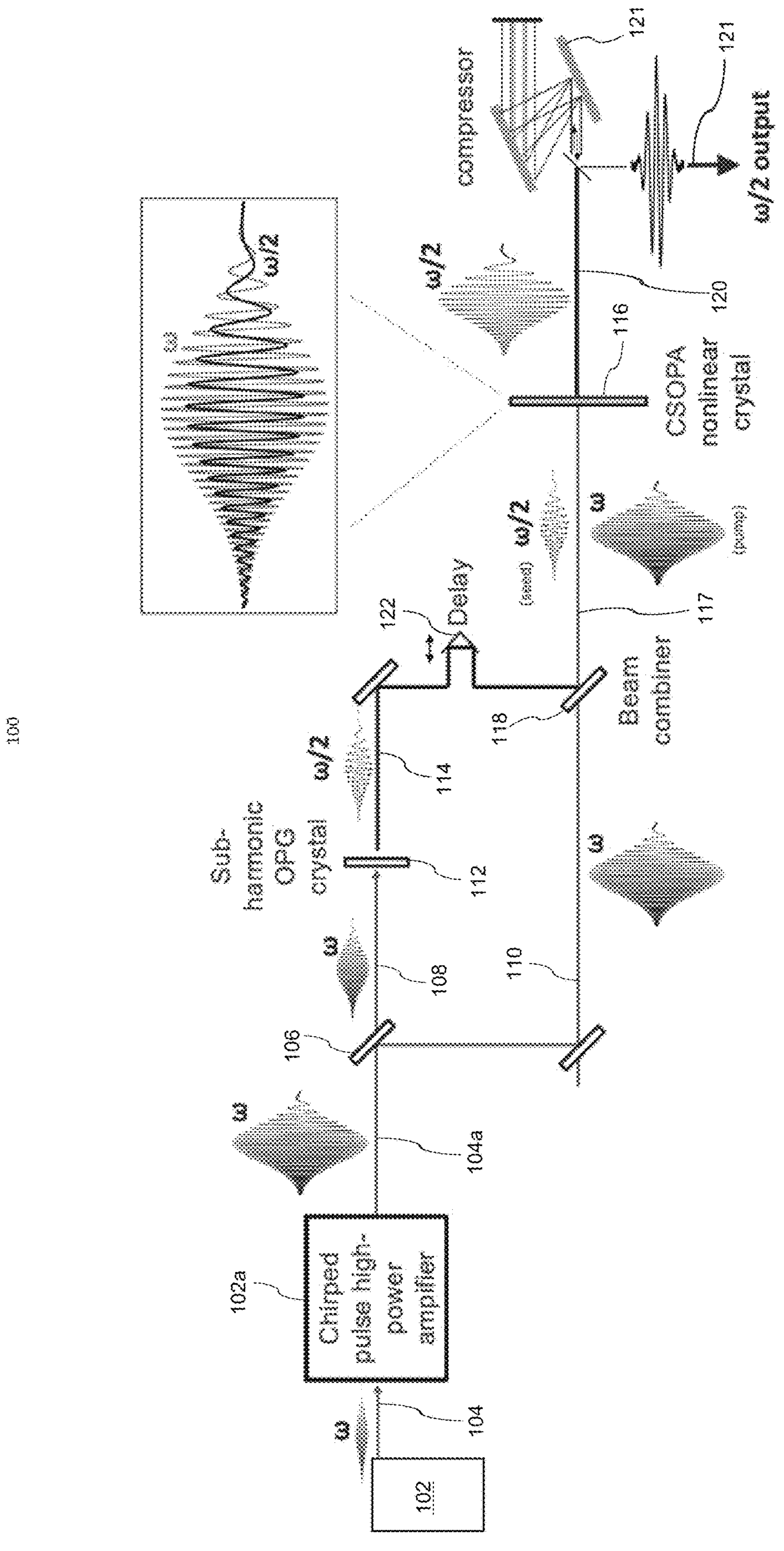
FIG. 1D is a schematic diagram of an embodiment of a system in accordance with this disclosure.

Referring to FIG. 1D, in certain embodiments, the system 100 can include a chirped pulse amplifier 102*a* between the input optical source 102 and the beamsplitter 106 and configured to output a chirped input optical signal 104*a*. In this regard, the one or more input optical signals 104 are chirped upstream of the beamsplitter 106.

In certain embodiments, e.g., as shown in FIG. 1D, the nonlinear material 116 is or includes a nonlinear crystal. In certain embodiments, the nonlinear material 116 can be or include at least one of a periodically-poled oxide, a birefringent crystal, an orientation-patterned cubic crystal, or an orientation-patterned hexagonal crystal. As shown in FIG. 1D, the system 100 can include a compressor 121 configured to compress the amplified output signal 121 to output a compressed output signal 123.

In certain embodiments, the system 100 can include the input optical source 102. In certain embodiments, the input optical source 102 is a laser source configured to output laser light. In certain embodiments, the system 100 can include an amplifier (e.g., amplifier 102*a*) upstream of the beamsplitter 106 and configured to amplify the one or more input optical signals 104.

Figure 2A:
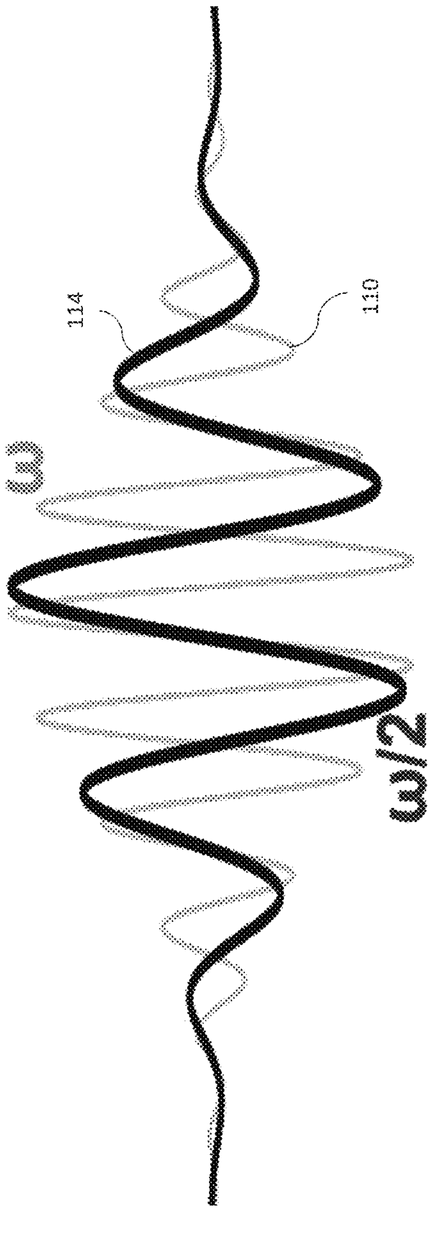
FIG. 2A is a schematic diagram of an embodiment of a short pulse optical signal in accordance with this disclosure.
Figure 2B:
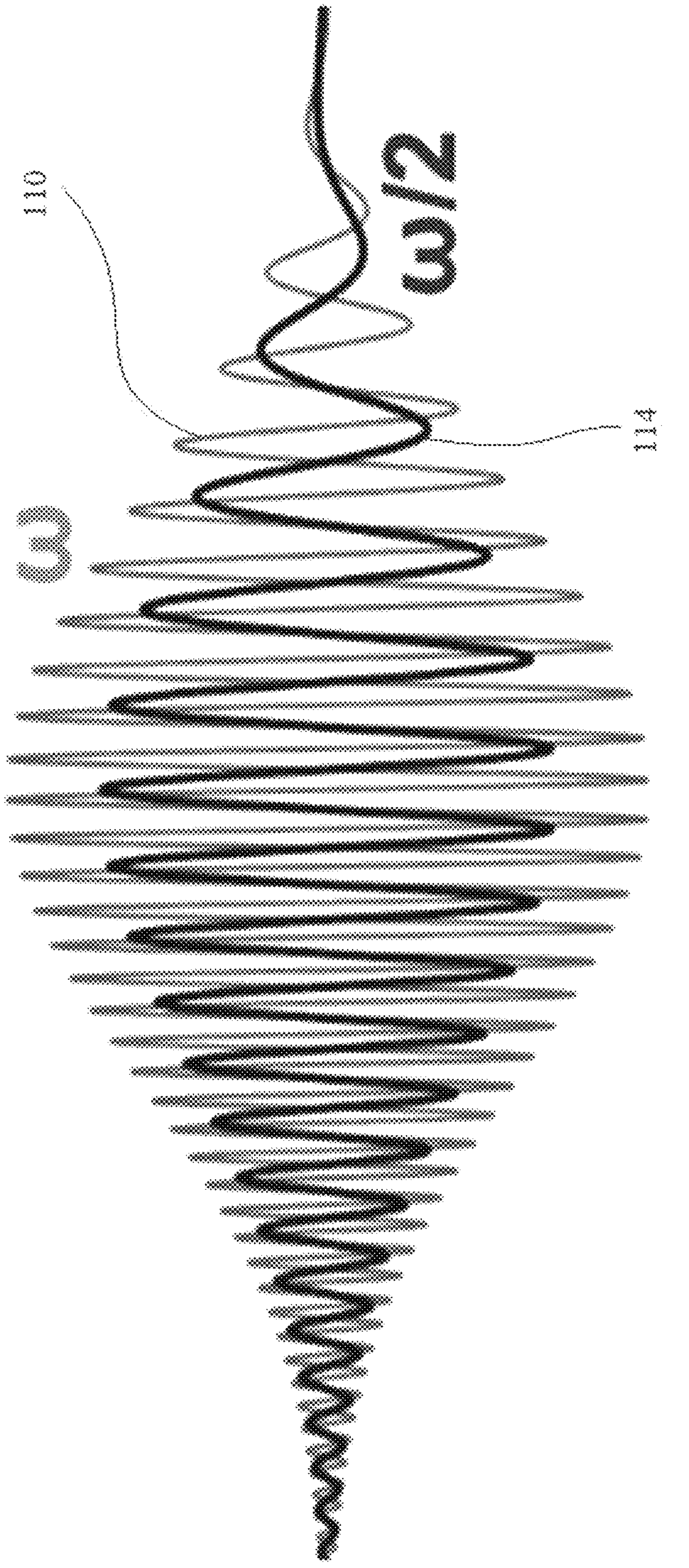
FIG. 2B is a schematic diagram of an embodiment of a chipped pulse optical signal in accordance with this disclosure.

FIG. 2A shows an embodiment of a short pulse. For example, the short pulse can include only a few cycles, and is bandwidth limited and incompressible. FIG. 2B shows an embodiment of a chirped signal having several cycles. This chirped signal is compressible as it is not bandwidth limited.

Figure 3:
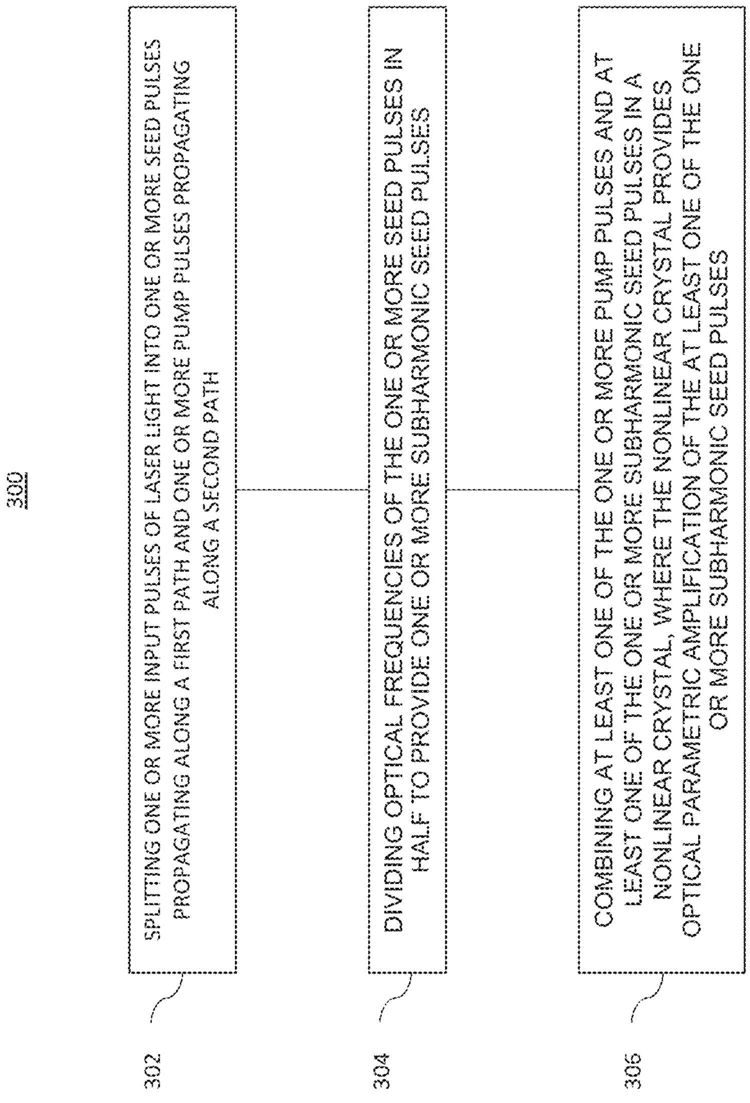
FIG. 3 is a schematic diagram of an embodiment of a method in accordance with this disclosure.

In accordance with at least one aspect of this disclosure, referring additionally to FIG. 3, a method 300 can include splitting (e.g., at block 302) one or more input optical signals of laser light into one or more seed optical signals propagating along a first path and one or more pump optical signals propagating along a second path, dividing (e.g., at block 304) optical frequencies of the one or more seed optical signals in half to provide one or more subharmonic seed optical signals, and combining (e.g., at block 306) at least one of the one or more pump optical signals and at least one of the one or more subharmonic seed optical signals in a nonlinear crystal. The nonlinear crystal can provide optical parametric amplification of the at least one of the one or more subharmonic seed optical signals.

In certain embodiments, dividing can include dividing the optical frequencies with a subharmonic optical parametric oscillator. In certain embodiments, the method can include amplifying the at least one of the one or more pump optical signals upstream of the beam combiner. In certain embodiments, amplifying can include amplifying the at least one of the one or more pump optical signals upstream of the beam combiner with an optical parametric chirped-pulse amplifier (OPCPA). In certain embodiments, dividing can include dividing the optical frequencies of the one or more seed optical signals with an additional nonlinear crystal configured as a subharmonic optical parametric generator. In certain embodiments, the method can further include chirping the one or more input optical signals and/or amplifying the one or more input optical signals upstream of the beamsplitter.

Embodiments can be applicable to output in the mid infrared range (e.g., about 4 microns to about 20 microns) or any other desired signal. Certain embodiments can be relatively small. For example, certain embodiments can be used to create a tabletop x-ray device, or other isotope source for medical use, for example. In certain embodiments, the output signal can be used to accelerate photons to high energy. Output wavelengths in mid-IR, for example, can be used to make very high energy x-rays, for example, which can go through significantly more material than traditional systems. The energy level of photons can be inversely proportional to power/wavelength of output (e.g., smaller mid IR equates to higher energy photons).

In certain embodiments, the beamsplitter 106 can split about 1% to about 10% of the input optical signal to become the seed. The amount split can be a function of how much amplification energy is desired. One having ordinary skill in the art in view of this disclosure appreciates, without undue experimentation, how to calculate and achieve a desired split.

Certain embodiments can include a delay system configured to make signals meet at the right time at the beam combiner 118. In certain embodiments, the one or more seed optical signals and the one or more pump optical signals should be within about a nm of each other to work right. One having ordinary skill in the art in view of this disclosure appreciates, without undue experimentation, how to calculate and achieve a desired delay to achieve a desired combination of signals.

Certain embodiments result in the amplification of $\omega/2$ frequencies of input signal having a frequency of $\omega$. Certain embodiments can utilize a non-linear material (e.g., a crystal) as a function of the operational frequencies. One having ordinary skill in the art in view of this disclosure appreciates, without undue experimentation, how to select a suitable non-linear material to result in desired output amplification based on the input combined optical signal from the beam combiner 118.

Certain embodiments can be used to produce intense and super-intense ultrashort laser pulses in the mid-infrared region of the spectrum. Certain embodiments can provide optical parametric amplification (OPA), optical parametric chirped pulse amplification (OPCPA), subharmonic generation, and/or a coherent subharmonic optical parametric amplifier. Certain embodiments (e.g., all embodiments) can include a coherent subharmonic optical parametric amplifier.

Example embodiments are described below with reference to certain figures and without limitation to other embodiments disclosed herein (e.g., as described above). Embodiments can include a system (e.g., systems 100 as shown in FIGS. 1A-1D) having a laser source configured to generate one or more input optical signals (e.g., pulses or a continuous wave) of laser light, and a beamsplitter in optical communication with the laser source and configured to split the one or more input optical signals into one or more seed optical signals configured to propagate along a first optical path and one or more pump optical signals configured to propagate along a second optical path. The system can include a frequency divider in optical communication with the beamsplitter to receive the one or more seed optical signals, the frequency divider configured to divide optical frequencies of the one or more seed optical signals in half to provide one or more subharmonic seed optical signals. The system can include a beam combiner in optical communication with the frequency divider to receive the one or more subharmonic seed optical signals, and with the second optical path to receive the one or more pump optical signals, wherein the beam combiner is configured to combine at least one of the one or more pump optical signals and at least one of the one or more subharmonic seed optical signals to provide a combined optical signal. The system can include a nonlinear material in optical communication with the beam combiner to receive the combined optical signal, wherein the nonlinear material is configured to provide optical parametric amplification of the at least one of the one or more subharmonic seed optical signals of the combined optical signal.

Certain embodiments can be or include a coherent subharmonic optical parametric amplifier (CSOPA) system. In certain embodiments, a CSOPA system can include a beamsplitter to split a input light pulse into a seed pulse and a pump pulse, a frequency divider to reduce frequencies of the seed pulse by half to generate a subharmonic seed pulse, a beam combiner to combine the pump pulse and the subharmonic seed pulse, and a nonlinear material (e.g., a nonlinear crystal, or the like) to amplify the subharmonic seed pulse through optical parametric amplification. As an illustration, an input pulse with a center frequency of ω (e.g., angular frequency) may be split into seed and pump pulses, where the frequency divider converts the seed pulse to a subharmonic seed pulse having a center frequency of ω/2. Combining the pump and subharmonic seed pulses in the nonlinear crystal may result in optical parametric amplification of the subharmonic pulses with the center frequency of ω/2 using the energy of the pump pulses.

It is noted that that light may be described herein either in terms of frequency or wavelength as convenient. For example, it may be convenient or conventional to describe light from a specific laser in terms of wavelength (e.g., in units of micrometers (μm)). As another example, it may be convenient or conventional to describe nonlinear optical phenomena in terms of optical angular frequency (ω), which is simply referred to as frequency herein. It is thus to be understood that the particular units used in any examples herein are merely illustrative and not limiting.

Certain embodiments of a CSOPA system as disclosed herein may enable the generation of relatively long-wavelength light (e.g., mid-infrared light, far-infrared light, or the like) with higher intensities than provided by alternative techniques. For example, optical subharmonic generation (e.g., frequency division by 2, wavelength multiplication by 2, or any suitable division or multiplication by a factor, e.g., a multiple of 2) has been demonstrated with a subharmonic optical parametric oscillator (OPO). However, such subharmonic OPOs that operate at high (e.g., 50 MHz to 1 GHz) repetition rate and typically provide only low-energy pulses (e.g., 1-5 nJ). As another example, state-of-the-art high-energy few-optical-cycle mid-IR laser systems typically involve a master oscillator and a chain of laser amplifiers (e.g. based on Tm:fiber pumped Ho:YLF laser medium operating at 2 μm wavelength) serving as a pump for optical parametric chirped pulse amplification (OPCPA) to achieve, after pulse compression, TW-level few-cycle pulses at >4 μm. However, the efficiency of such methods is low. For example, converting 2-μm radiation to a 7-μm output happens with less than 1% efficiency.

A typical technique for producing intense ultrafast long-wavelength MIR pulses is frequency down conversion from well-developed near-IR laser outputs (at typically 0.8-2 μm wavelength) using an optical parametric amplifier (OPA) or its variant, a chirped pulse OPA (OPCPA) approach. In a traditional OPA pumped by a laser at an angular frequency $\omega_{pump}$, the photon energy is divided between the signal and idler photons $\omega_{signal}$ and $\omega_{idler}$. Photon energy conservation dictates that $\omega_{pump}=\omega_{signal}+\omega_{idler}$. Assuming that the complex electric fields of the pump, signal, and idler are correspondingly in the form $E_i e^{i(\omega_i+\phi_i)}$, where i=1, 2, 3 stand for "idler," "signal," and "pump" waves correspondingly, the relationship between their phases is expressed as:

$$\varphi_3-\varphi_2-\varphi_1=\frac{\pi}{2} \tag{1}$$

to ensure that the energy flows from the pump to the signal and idler waves. A seed for the OPA is usually one of two waves: "signal" or "idler" (assume the "signal" wave for certainty). Then the complementary wave will emerge with a phase that automatically fulfils equation (1). However, the typical conversion efficiency of such OPA/OPCPA devices is low (e.g., less than 1%), which necessitates building large and complicated laser setups.

In contrast, conversion efficiency of energy from the pump pulse to the subharmonic wavelengths may exceed 50% using certain embodiments of a system (e.g., a CSOPA system) as disclosed herein due to (i) the total photon recycling and (ii) non-dissipative nature of parametric conversion. In certain embodiments, such a system can include precise control of the relative phases of a pump pulse and a subharmonic seed pulse, which may be satisfied using an adjustable time delay such as, but not limited to, a piezo-electric actuator.

It is further contemplated herein that the systems and methods disclosed herein enable at least three major classes of applications: (1) tabletop source of coherent X-rays suitable for, but not limited to, super-resolution imaging in medicine and nanotechnology; (2) tabletop laser-driven plasma-based electron accelerators suitable for, but not limited to, medical applications including physical therapy; and (3) generating X-ray pulses with attosecond durations suitable for characterizing some of the fastest events in the natural world such as, but not limited to, dynamics of molecular orbitals or electron clouds. Any other suitable uses are contemplated herein.

Referring now to FIGS. 1A-3, systems and methods for coherent subharmonic optical parametric amplification are described in greater detail, in accordance with one or more embodiments of this disclosure. FIG. 1A is a simplified schematic of a CSOPA system 100, in accordance with one or more embodiments of this disclosure.

In certain embodiments, a system 100 (e.g., a CSOPA system) includes a optical input source 102 (e.g., a laser source) to generate one or more input optical signals 104 of laser light and a beamsplitter 106 to split the input optical signals 104 into one or more seed optical signals 108 and one or more pump optical signals 110. The beamsplitter 106 may split the optical signal energy of the input optical signals 104 by any suitable or desired ratio. In certain embodiments, a beamsplitter 106 may be a 50/50 beamsplitter and provide pump optical signals 110 and seed optical signals 108 with equal optical signal energies. In certain embodiments, the beamsplitter 106 may split the optical signal energies unequally. In certain embodiments, it may be desirable that the pump optical signals 110 have greater energy.

In certain embodiments, the system 100 (e.g., a CSOPA system) can further include a frequency divider 112 to reduce the optical frequencies of the seed optical signals 108 by half or equivalently multiply the wavelengths of the seed optical signals 108 by two. For the purposes of illustration, the seed optical signals 108 with the halved frequencies from the frequency divider 112 can be referred to herein as sub-harmonic seed optical signals 114 (e.g., one or more pulses). In certain embodiments, the frequency divider 112 may divide the frequencies associated with a spectrum of the seed optical signals 108 by two. In certain embodiments, an optical input source 102 (e.g., a laser source) can generate input optical signals 104 with a center frequency ω (e.g., optical angular frequency) which may result in pump optical signals 110 with the same center frequency ω and sub-harmonic seed optical signals 114 with a center frequency ω/2.

In certain embodiments, the system 100 (e.g., a CSOPA system) may further include a nonlinear material 116 and a beam combiner 118 to overlap at least some of the pump optical signals 110 and at least some of the sub-harmonic seed optical signals 114 in the nonlinear material 116 in both space and time, where the nonlinear material 116 amplifies the sub-harmonic seed optical signals 114 with energy from the pump optical signals 110 through optical parametric amplification. The amplified sub-harmonic seed optical signals 114 from the nonlinear material 116 can be referred to herein as amplified subharmonic optical signals 120.

It is contemplated herein that the system 100 disclosed herein can utilize a strict and precisely controlled temporal relationship (e.g., phase relationship) between the pump optical signals 110 and the sub-harmonic seed optical signals 114 within the nonlinear material 116. For example, the system 100 can utilize a process ω=ω/2+ω/2, where the co-polarized seed signal and idler optical signals are indistinguishable, so that $\phi_1=\phi_2=\phi_{1,2}$. Equation (1) thus can be reduced to:

$$\phi_3 - 2\phi_{1,2} = \frac{\pi}{2}, \tag{2}$$

which shows an example of a strict phase relation between the pump optical signals 110 at a frequency ω and the sub-harmonic seed optical signals 114 at ω/2 at the input of the nonlinear material 116. FIGS. 2A and 2B indicate simplified illustrations of the relative positions of pump optical signals 110 and sub-harmonic seed optical signals 114 in the time domain at the entrance of the nonlinear material 116 for non-chirped and chirped configurations, respectively, in accordance with one or more embodiments of this disclosure.

This can also be shown in a different way. Parametric gain, associated with the $2^{nd}$ order nonlinearity, for the wave at the angular frequency ω1 may be described by:

$$\frac{dA_1}{dz} = -igA_3A_2^*, \tag{3}$$

where $A_1$, $A_2$, $A_3$ are normalized field amplitudes at frequencies $\omega_1$, $\omega_2$, and $\omega_3$ correspondingly, "*" means complex conjugate, and g is a nonlinear coupling coefficient (a real positive number). In the degenerate case, when $A_1=A_2$, Equation (3) becomes:

$$\frac{dA_1}{dz} = -igA_3A_1^* \tag{4}$$

To achieve the maximum gain increment in this equation, the following relation between the phases of the $A_1$ and $A_3$ should apply (one can use the relation $$-i = e^{-\frac{i\pi}{2}}\Big):\varphi_{1,2} = -\frac{\pi}{2} + \varphi_3 - \varphi_{1,2}.$$

This results in $$\varphi_3 - 2\varphi_{1,2} = \frac{\pi}{2},$$

which is the same as Equation (2).

In certain embodiments, the system 100 (e.g., a CSOPA system) includes a delay assembly 122 (e.g., a delay line) to control the relative phase between the sub-harmonic seed optical signals 114 and the pump optical signals 110. The delay assembly 122 (e.g., a delay line) may include any optical components suitable for controlling the relative phase between the sub-harmonic seed optical signals 114 and the pump optical signals 110. For example, as illustrated in FIG. 1A, the delay assembly 122 (e.g., a delay line) may include mirrors 124 located on a translation stage 126 such as, but not limited to, a piezoelectric actuator. It is noted that the efficiency of the OPA process in the nonlinear material 116 may be a function of the accuracy of the relative delay between the pump optical signals 110 and the sub-harmonic seed optical signals 114 (e.g., how accurately Equation (2) is maintained). In certain embodiments, it may be desirable or necessary to achieve a relative spatial delay between pump optical signals 110 and the sub-harmonic seed optical signals 114 of approximately 10 nm or less, which can be much smaller than the wavelength of the pump laser. This can be achievable using a precision translation stage 126 or other suitable techniques appreciated by those having ordinary skill in the art in view of this disclosure. The delay assembly 122 (e.g., a delay line) may be located in any suitable location such as, but not limited to, in an optical path of the sub-harmonic seed optical signals 114 or an optical path of the pump optical signals 110.

Referring generally to FIGS. 1A-1D, it is contemplated herein that the system 100 (e.g., a CSOPA system) may be implemented in a variety of configurations within the spirit and scope of this disclosure. Any other suitable additional components added to or removal of unnecessary components from the shown embodiments is contemplated herein.

The optical input source 102 (e.g., a laser source) may include any type of laser source known in the art providing input optical signals 104 suitable for the CSOPA process. Similarly, any of the input optical signals 104 may have any selected spectrum (e.g., range of optical frequencies or equivalently wavelengths), optical signal duration, and/or optical signal energy suitable for the CSOPA process.

In certain embodiments, the optical input source 102 (e.g., a laser source) includes a femtosecond laser source. For example, the optical input source 102 (e.g., a laser source) may include a femtosecond laser oscillator. In certain embodiments, the optical input source 102 (e.g., a laser source) may include a femtosecond laser amplifier. In certain embodiments, the optical input source 102 (e.g., a laser source) further includes carrier-envelope-phase (CEP) stabilization to provide input optical signals 104 with consistent and well-defined phases with respect to the associated carrier envelopes.

In certain embodiments, the input optical signals 104 have center frequencies w in near-IR to mid-IR spectral ranges to provide amplified subharmonic optical signals with frequencies ω/2 further into the mid-IR or far-IR spectral ranges. In this way, laser energy generated at a "convenient" wavelength (e.g., 2-10 μm) using well-developed and/or wall-plug efficient laser sources may be efficiently converted to longer-wavelength light using single or cascaded subharmonic generation frequency division. For example, the optical input source 102 (e.g., a laser source) may include a Ho:YLF laser to provide input optical signals 104 with a center frequency of 2 μm and sub-harmonic wavelength of 4 μm. As another example, the optical input source 102 (e.g., a laser source) may include a Cr:ZnS/ZnSe laser to provide input optical signals 104 with a center wavelength of 2.5 μm and a subharmonic wavelength of 5 μm. As another example, the optical input source 102 (e.g., a laser source) may include a Fe:ZnSe laser to provide input optical signals 104 with a center wavelength of 4.3 μm and a subharmonic wavelength of 8.6 μm.

Further, multiple systems 100 (e.g., a CSOPA system) may be cascaded to successively generate light with longer wavelengths. For example, input optical signals 104 with an initial wavelength of 2 μm may be converted to 4 μm with a first system 100 (e.g., a CSOPA system) and then converted to 8 μm with a second system 100 (e.g., a CSOPA system). As another example, input optical signals 104 with an initial wavelength of 2.5 μm may be converted to 5 μm with a first system 100 (e.g., a CSOPA system) and then converted to 10 μm with a second system 100 (e.g., a CSOPA system). This technique can enable extending the wavelength of existing lasers to the highly desirable long-wavelength mid-infrared range.

The nonlinear material 116 may include any type of material known in the art suitable for providing parametric amplification of the sub-harmonic seed optical signals 114 such as, but not limited to, a crystal. Further, the selection of the nonlinear material 116 may depend on the selected wavelengths of the sub-harmonic seed optical signals 114 as well as the pump optical signals 110. In certain embodiments, the nonlinear material 116 is or includes periodically-poled (PP) oxides, e.g., one or more of PPLN (PP-$LiNbO_3$), PPLT (PP-$LiTaO_3$), PPKTP (PP-$KTOPO_4$), PPKTA (PP-$KTIOAsO_4$), PPRTA (PP-$RbTIOAsO_4$). In certain embodiments, the nonlinear material 116 is or includes birefringent crystals, e.g., one or more of AGS ($AgGaS_2$), AGSe ($AgGaSe_2$), CSP ($CdSiP_2$), LIS ($LiInS_2$), LGS ($LiGaS_2$), BGSe ($BaGa_4Se_7$), CdSe, ZGP ($ZnGeP_2$), GaSe, CGA ($CdGeAs_2$). In certain embodiments, the nonlinear material 116 is or includes orientation patterned (OP), cubic crystals, e.g., one or more of OP-GaAs, OP-GaP, OP-ZnSe. In certain embodiments, the nonlinear material 116 is or includes orientation patterned, hexagonal crystals, e.g., OP-GaN.

The frequency divider 112 may include any number of components suitable for generating sub-harmonic seed optical signals 114 from portions of the input optical signals 104. In certain embodiments, the frequency divider 112 includes a nonlinear material such as, but not limited to a crystal. In certain embodiments, the frequency divider 112 may be or include, but is not limited to, a crystal (e.g., a sub-harmonic optical parametric generation (OPG) crystal) having any of the compositions listed above with respect to the nonlinear material 116 used for optical parametric amplification. It is understood, however, that various aspects of such a crystal such as, but not limited to, the composition, thickness, or the angle with respect to the seed optical signals 108 may be tuned for sub-harmonic generation.

In certain embodiments, the seed frequency divider 112 can be or include a sub-harmonic optical parametric oscillator (OPO). For example, a sub-harmonic OPO may include a nonlinear material (e.g., as described above) within a cavity. In certain embodiments, the sub-harmonic OPO may provide gain at the sub-harmonic frequency.

Referring now generally to FIGS. 1A-1D, various configurations of the system 100 (e.g., a CSOPA system) suitable for high-power operation are described in greater detail, in accordance with one or more embodiments of this disclosure. In a general sense, it may be desirable that the pump optical signals 110 have relatively high optical signal powers (e.g., much higher than the sub-harmonic seed optical signals 114 in some cases) to facilitate the generation of amplified subharmonic optical signals 120 with high optical signal powers.

In some embodiments, the system 100 (e.g., a CSOPA system) includes one or more amplifiers to amplify at least some of the pump optical signals 110 prior to the beam combiner 118. Any number or type of amplifiers may be used in this configuration such as, but not limited to, a chirped-pulse amplifier (CPA), an optical parametric amplifier (OPA), or an optical parametric chirped-pulse amplifier (OPCPA). Further, the system 100 (e.g., a CSOPA system) may include multiple amplifiers to provide multiple stages of amplification. For instance, the system 100 (e.g., a CSOPA system) may include one or more preamplifiers and one or more main-stage amplifiers or power amplifiers for a pump optical signal.

FIGS. 1B-1D depict three non-limiting configurations of the system 100 (e.g., a CSOPA system), in accordance with one or more embodiments of this disclosure. FIG. 1B is a simplified schematic of a system 100 (e.g., a CSOPA system) with multi-stage pump amplification and a frequency divider 112 configured as a sub-harmonic OPO, in accordance with one or more embodiments of this disclosure. In particular, in certain embodiments, the system 100 (e.g., a CSOPA system), e.g., as shown in FIG. 1B, includes a femtosecond mode-locked master oscillator as the optical input source 102 (e.g., a laser source), along with a preamplifier 128 and a main amplifier 130 for multi-stage amplification of the pump optical signals 110. The main amplifier 130 may include any type of amplifier including, but not limited to, a single or multi-stage chirped pulse amplifier providing chirping and recompression of the pump optical signals 110. Further, in certain embodiments, the system 100 (e.g., a CSOPA system) includes a pulse picker 132 prior to the main amplifier 130, which may select a single pump optical signal 110 or provide pump optical signals 110 with a selected lower repetition rate than provided by the optical input source 102 (e.g., a laser source).

As an illustration, the beamsplitter 106 may split the optical signal energies of input optical signals 104 unequally and provide the relatively smaller fraction as the seed optical signals 108, which may in turn operate as pump light for the sub-harmonic OPO (the frequency divider 112). The pump optical signals 110 may then be amplified by the preamplifier 128 and the main amplifier 130 to relatively high optical signal energies (e.g., up to multi-mJ or greater). The OPA process in the nonlinear material 116 may then generate amplified subharmonic optical signals 120 (e.g., through parametric amplification). FIG. 2A depicts a relative position in space at the exit of the nonlinear material 116 of the w pump optical signals 110 and the ω/2 seed optical signals 116. For example, conversion efficiency may exceed 50% since the parametric process is non-dissipative and all photons are recycled in the process.

FIG. 1C is a simplified schematic of a system 100 (e.g., a CSOPA system) with an amplified optical input source 102 (e.g., a laser source) and a frequency divider 112 configured as a single-pass sub-harmonic optical parametric generator (OPG) crystal, in accordance with one or more embodiments of this disclosure. For example, the optical input source 102 (e.g., a laser source) in FIG. 1C may include a femtosecond laser amplifier providing carrier-envelope phase (CEP)-stabilized femtosecond input optical signals 104 with relatively high optical signal energies (e.g., up to multi-mJ or greater). As an illustration, such a optical input source 102 (e.g., a laser source) may include a chirped pulse amplifier with subsequent pulse compression. Further, in certain embodiments, the frequency divider 112, e.g., as shown in FIG. 1C, is a sub-harmonic OPG crystal (e.g., a single-pass device). For example, the beamsplitter 106 system 100 (e.g., a CSOPA system) may direct a small portion of the CEP stabilized input optical signals 104 to serve as a pump for the subharmonic OPG crystal to generate the sub-harmonic seed optical signals 114 with a frequency ω/2, which serves as a seed for the system 100 (e.g., a CSOPA system). FIG. 2A depicts a relative position in space at the exit of the nonlinear material 116 of the w pump optical signals 110 and the ω/2 seed optical signals 116. As described previously herein, the conversion efficiency may exceed 50% since the parametric process is non-dissipative and all photons are recycled in the process.

FIG. 1D is a simplified schematic of a system 100 (e.g., a CSOPA system) utilizing chirped pulses, in accordance with one or more embodiments of this disclosure. In FIG. 1D, input optical signals 104 provided to the beamsplitter 106 are chirped (e.g., stretched in time from femtosecond duration to few hundred picoseconds or even a nanosecond) and may have relatively high optical signal energies (e.g., up to multi-mJ or greater). It is contemplated herein that the sign of the chirp may be either positive or negative (hence the direction of time flow can be from left to right or from right to left in FIG. 2B). For example, input optical signals may be amplified by a chirped-pulse amplifier 134 (e.g., a high-power amplifier). A small portion of this chirped input optical signal 104 with a center frequency ω can serve as a seed for the subharmonic optical parametric generator (OPG) (e.g., the frequency divider) that generates a seed optical signal 114 with a center frequency ω/2 and which has the same sign of the chirp as the input optical signal 104 with the chirp value (dω/dτ), where t is the time in the moving frame) of half of that of the input optical signal 104. This seed optical signal 114 (e.g., one or more pulses) serves as a seed for the chirped CSOPA. The pulse can be overlapped (in time and space) with the intense chirped pump optical signal 110 (e.g., one or more pulses) with a center frequency ω in the beam combiner 118 and the combined beam is directed to the nonlinear material 116, where the ω\2 seed optical signal 114 (e.g., one or more pulses) is parametrically amplified to achieve a more intense subharmonic with high (e.g., greater than 50%) conversion efficiency. FIG. 2B depicts a relative position in space at the exit of the nonlinear material 116 of the ω pump optical signals 110 (e.g., one or more pulses) and the ω/2 seed optical signals 116 (e.g., one or more pulses). Similar to the embodiments depicted in FIGS. 1B and 1C, it can be an efficient process since at any given moment of time τ in the moving frame, the instantaneous frequency of the pump optical signal 110 (e.g., one or more pulses) ω(τ) can be matched in terms of its absolute phase to its subharmonic ω(τ)/2. The length of the nonlinear material 116 can be chosen in such a way that the condition of phase matching is satisfied over the entire bandwidth of the pump optical signal 110 (e.g., one or more pulses), noting that phase matching bandwidth is inversely proportional to the length of the material. The phase relation from Equation (2) can be satisfied through the whole length of the interacting chirped pulses because of (i) the proper fine adjustment of the mutual delay between the pulses and (ii) the fact that the seed optical signal 114 (e.g., one or more pulses) is produced via subharmonic generation and has the same chirp as the pump optical signal 110 (e.g., one or more pulses) (scaled down by a factor of 2). Also shown in FIG. 1D is a simple compressor 136 based on two diffraction gratings, where, in the case of a positive frequency chirp, the long-wavelength components travel a larger distance than the short-wavelength components to compress the half-harmonic pulses to their bandwidth-limited femtosecond-scale pulse duration, down to a single optical cycle. However, it is contemplated herein compressor 136 may have any design suitable for compressing the amplified subharmonic pulses 120.

Referring generally to FIGS. 1B-1D, it is contemplated herein that very high conversion efficiency can be provided in certain embodiments (e.g., all) because (i) all photons are recycled in this process and (ii) parametric process is non-dissipative. In contrast to traditional OPAs/OPCPAs, the seed optical signal 114 (e.g., one or more pulses) at ω/2 and the pump pulse at ω can be mutually coherent in the sense that their relative phases are well correlated. This phase correlation can be achieved automatically in certain embodiments (e.g., all) herein, since the ω/2 seed optical signal 114 (e.g., one or more pulses) is created as a subharmonic of the main input pulse 104 at frequency ω via a frequency divider 112 (e.g., a subharmonic OPO, an OPG, or the like). In addition to proper overlapping of the envelopes of the seed optical signals 114 (e.g., one or more pulses) and the pump optical signals 110 (e.g., one or more pulses) (e.g., with a delay accuracy of approximately a few μm), the relative phase between the two pulses in the nonlinear material 116 can be adjusted to π/2 to fulfill Equation (2), which translates to the sub-optical-cycle accuracy of the relative spatial delay between the pulses of about 10 nm. This may be achieved using any suitable delay assembly 122 (e.g., a delay line) such as, but not limited to, a piezo actuator.

Further, the system 100 (e.g., a CSOPA system) may be suitable for the generation of amplified subharmonic pulses 120 any suitable wavelength from any suitable input laser sources 102. As a non-limiting illustration, the input pulses 104 may have wavelengths in a range of 1-10 μm to provide amplified subharmonic pulses 120 at wavelengths in a range of 2-20 μm.

FIG. 3 is a flow diagram illustrating steps performed in a method 300, in accordance with one or more embodiments of this disclosure. Embodiments and enabling technologies described previously herein in the context of the system 100 (e.g., a CSOPA system) can be utilized with the method 300. The method 300 is not limited to the architecture of the system 100 (e.g., a CSOPA system) or any disclosed embodiments thereof.

In certain embodiments, the method 300 includes a step 302 of splitting one or more input pulses 104 of laser light into one or more seed pulses 108 propagating along a first path and one or more pump optical signals 110 (e.g., one or more pulses) propagating along a second path. In certain embodiments, the method 300 includes a step 304 of dividing optical frequencies of the one or more seed pulses 108 in half to provide one or more sub-harmonic seed optical signals 114 (e.g., one or more pulses). In certain embodiments, the method 300 includes a step 306 of combining at least one of the one or more pump optical signals 110 (e.g., one or more pulses) and at least one of the one or more sub-harmonic seed optical signals 114 (e.g., one or more pulses) in a nonlinear material 116. The nonlinear material 116 can provide optical parametric amplification of the at least one of the one or more sub-harmonic seed optical signals 114 (e.g., one or more pulses).

The following references are incorporated herein by reference in their entirety: P. B. Corkum and F. Krausz, Attosecond science, Nature Physics 3, 381-387 (2007); G. Cerullo and S. De Silvestri, Ultrafast optical parametric amplifiers, Review of Sci. Instrum. 74, 1 (2003); Dubietis, R. Butkus, and A. P. Piskarskas, Trends in chirped pulse optical parametric amplification, IEEE J. of Sel. Topics in Quant. Electron. 12, 163 (2006); U. Elu, T. Steinle, D. Sánchez, L. Maidment, K. Zawilski, P. Schunemann, U. D. Zeitner, C. Simon-Boisson, and J. Biegert, Table-top high-energy 7 μm OPCPA and 260 mJ Ho:YLF pump laser, Opt. Lett. 44, 3194 (2019); and K. L. Vodopyanov, S. T. Wong, & R. L. Byer, Infrared frequency comb methods, arrangements and applications. U.S. Pat. No. 8,384,990 (2013).

Ultrashort pulses of coherent mid-infrared (MIR) laser radiation are playing an increasingly important role in many new areas, such as high-field physics, attosecond science, producing coherent x-rays via high harmonic generation in noble gases, and most recently in solids, and table-top laser-driven particle accelerators. These applications require intense (1-10 GW) to super-intense (10 GW-1 PW) peak power pulses in the difficult-to-achieve long-wavelength ($\lambda$>5 μm) MIR spectral range. To achieve these high peak powers, ultrafast (10-500 fs duration) pulses are used with pulse energies from millijoules to Joules.

The prevailing technique for producing intense ultrafast long-wavelength MIR pulses so far is frequency down conversion from well-developed near-IR laser outputs (at typically 0.8-2 μm wavelength) using optical parametric amplifiers (OPAs) for moderate (mJ) pulse energies, or its variant, a chirped pulse OPA (OPCPA) approach for the generation of the highest peak powers and intensities. The typical conversion efficiency of such OPA/OPCPA devices is low, typically <1%, which necessitates building large, expensive, and complicated laser setups.

Certain embodiments can include Coherent Subharmonic Optical Parametric Amplifier (CSOPA), e.g., a device for converting intense laser pulses to half their center frequency and thus extending their wavelength to highly desirable long-wavelength MIR domain. Optical subharmonic generation (frequency division by 2) was demonstrated with a subharmonic optical parametric oscillator (OPO) with the main advantages of high (~50%) conversion efficiency, broad bandwidth, and coherent nature of the frequency conversion in the sense that the coherence of the near-IR pump pulses can be preserved in the MIR output pulses. However, subharmonic OPOs that operate at high (e.g., 50 MHz to 1 GHz) repetition rates and provide only low-energy (e.g., 1-10 nJ) pulses.

As compared to the subharmonic OPO, CSOPA uses a single intense input pump pulse, a single or double pass through a nonlinear crystal, and does not require a resonator. Subharmonic MIR pulses of much higher peak power, as compared to prior art, can be achieved due to (i) total photon recycling and (ii) non-dissipative nature of parametric conversion, high, (e.g., greater than 50%) conversion efficiency to the MIR subharmonic pulses is expected. However, as opposed to OPA, certain embodiments can have a perfect or near perfect phase relationship, at the input of the nonlinear crystal, between the seed MIR pulse and the pump near-infrared pulse.

The embodiments of this disclosure opens up three major classes of applications: (1) tabletop source of coherent X-rays that might be used for super-resolution imaging in medicine and nanotechnology; (2) tabletop laser-driven plasma-based electron accelerators for medical applications including physical therapy, and (3) in fundamental science, e.g., for creating X-ray pulses with attosecond durations, that can be applied to capture the fastest events in the natural world, for instance for imaging molecular orbitals and electron clouds.

Certain embodiments, e.g., are further described below utilized with pulses, for example. In certain embodiments, the setup starts from a femtosecond mode-locked master oscillator at a center frequency $\omega$. Its output can be split into two parts using a beamsplitter, where one beam serves as a pump for the subharmonic OPO and generates an output at a central frequency $\omega/2$ and serves as a seed for the CSOPA. The other beam from the beamsplitter can be sent to a pulse picker to select a single pulse from the train of pulses; it can be amplified in an amplifier (possibly a multistage chirped pulse amplifier with chirping and recompression of the pulse) to a high (up to multi-mJ) pulse energy. Next, the subharmonic seed pulse at $\omega/2$ can be combined using a beam combiner with the intense amplified pump pulse at $\omega$ with a perfect overlapping in space and time (the time overlap can be achieved via a delay stage) and sent to a nonlinear CSOPA crystal, where the seed pulse can be parametrically amplified to an intense subharmonic pulse at $\omega/2$ with high (>50%) conversion efficiency.

Certain embodiments produce intense long-wavelength MIR pulses. For example, a seed pulse ($\omega/2$) can be produced by a subharmonic OPO and can be phase coherent to the strong pump pulse ($\omega$). The relative phases of $\omega/2$ and $\omega$ pulses at the exit of the nonlinear crystal can be suitably matched in space and time.

Certain embodiments can use a seed pulse from a subharmonic OPG in the OPA configuration. In certain embodiments, the setup can start from a single energetic femtosecond pulse (e.g. after a chirped pulse amplifier with subsequent pulse compression) with a high (up to multi-mJ) pulse energy at a center frequency $\omega$. A small portion of this pulse, derived by a beamsplitter, can serve as a pump for the subharmonic optical parametric generator (OPG), e.g., a single-pass device that generates an output at frequency $\omega/2$ and serves as a seed for the CSOPA. This seed pulse can be overlapped in space and time (the time overlap can be achieved via a delay stage) with the intense pump pulse at $\omega$ in the beam combiner and the combined beam can be directed to the nonlinear crystal where the $\omega/2$ seed can be parametrically amplified to achieve an intense subharmonic with high (>50%) conversion efficiency.

Certain embodiments can use a chirped seed and pump pulses in the OPCPA configuration. The world's highest-power lasers use chirped pulse amplification (CPA) or optical parametric chirped pulse amplification (OPCPA). These are two techniques for amplifying ultrashort laser pulses, where the input laser pulse can be temporally stretched to a much longer duration by means of a strongly dispersive element, then amplified, and eventually compressed using a dispersive compressor to achieve peak intensities up to the petawatt level (Nobel Prize in Physics in 2018). Certain embodiments can apply a Coherent Subharmonic Optical Parametric Amplifier to produce a subharmonic ($\omega/2$) of a chirped pulse at a center frequency $\omega$.

In certain embodiments, the setup can start from a single energetic chirped pump pulse after an amplifier (stretched in time from femtosecond duration to few hundred picoseconds or even a nanosecond) with a high (up to the Joule level) pulse energy. A small portion of this chirped pulse serves as a pump for the subharmonic optical parametric generator (OPG) that generates an output at the center frequency $\omega/2$ which has the same sign of the chirp as the pump with the chirp value ($d\omega/d\tau$, where $\tau$ is the time in the moving frame)

of half of that of the pump. This pulse serves as a seed for the chirped CSOPA. The pulse can be overlapped (in time and space) with the intense chirped pump pulse at ω in the beam combiner and the combined beam can be directed to the nonlinear crystal where the ω/2 seed can be parametrically amplified to achieve an intense subharmonic with high (e.g., greater than 50%) conversion efficiency. Similar to certain previously disclosed embodiments, it can be an efficient process since at any given moment of time τ in the moving frame of coordinated, the instantaneous frequency of the pump pulse ω(τ) can be matched in terms of its absolute phase to its subharmonic ω(τ)/2. The length of the CSOPA crystal can be chosen in such a way that the condition of phase matching can be satisfied over the entire bandwidth of the pump pulse (phase matching bandwidth can be inversely proportional to the length of the crystal). The phase relation from Eq. (2) can be satisfied through the whole length of the interacting chirped pulses because of (i) the proper fine adjustment of the mutual delay between the pulses and (ii) the fact that the seed pulse can be produced via subharmonic generation and has the same chirp as the pump pulse (scaled down by a factor of 2). Certain embodiments can also use a compressor, e.g., based on two diffraction gratings, where long-wavelength components travel a larger distance than the short-wavelength components, to compress the half-harmonic pulses to their bandwidth-limited femtosecond-scale pulse duration. The sign of chirp can be positive or negative, for example.

Embodiments can produce intense long-wavelength MIR pulses from the chirped pump and with the seed pulse (ω/2) can be produced in a subharmonic OPG. Very high conversion efficiency can be expected in disclosed embodiments, e.g., due to the fact that: (i) all photons are recycled in this process and (ii) parametric process can be non-dissipative. In contrast to traditional OPAs/OPCPAs, the important feature of the CSOPA can be that the seed pulse at ω/2 and the pump pulse at ω must be mutually coherent in the sense that their relative phases are well correlated. This phase correlation can be achieved automatically in all three embodiments, since the ω/2 seed pulse can be created as a subharmonic of the main pulse at frequency ω via either in a subharmonic OPO or in an OPG. In addition to proper overlapping of the envelopes of the seed and the pump pulses (delay accuracy of about a few μm), the relative phase between the two pulses in the nonlinear crystal must be adjusted to ω/2 to fulfill the Equation (2), which translates to the sub-optical-cycle accuracy of the relative spatial delay between the pulses of about 10 nm, for example. This may be achieved using a delay line that involves a piezo actuator, for example.

Crystals that can be used for a CSOPA can include those with $2^{nd}$ order nonlinearity (e.g., examples disclosed above). Embodiments can be suitable for various pumping sources (e.g., λ=1-10 μm) and the output center wavelength varying from about 2 to about 20 μm, for example. Any suitable spectral range is contemplated herein.

Embodiments of this disclosure make it possible to convert intense and super-intense near-IR pulses to the difficult-to-achieve MIR range. Certain benefits include (i) simplicity, (ii) low cost, and (iii) high (e.g., above 50%) conversion efficiency. Embodiments can provide a small form factor and allow for portable devices (e.g., for medical X-ray) where traditional devices are massive and permanent installations.

Certain uses for embodiments of this disclosure include Attosecond and high-field physics, generation of coherent X-rays via high harmonic generation in noble gases, generation of single attosecond X-ray pulses via high harmonic generation, compact laser-driven particle accelerators (including medical ion accelerators), and diffractionless propagation of long-wavelength laser pulses in the atmosphere via "mega-filaments," for example. The prevailing technique to generate intense ultrafast long-wavelength MIR pulses can be the optical parametric amplifier (OPA) approach or its variant, the chirped pulse optical parametric amplifier (OPCPA) approach. The typical conversion efficiency from near-IR to MIR in such devices is low, e.g., less than 1%, which requires building complicated and big laser facilities.

Certain embodiments of this disclosure can include a coherent subharmonic generator offers the possibility for (i) simplicity, (ii) compactness, and (iii) high conversion efficiency. Certain embodiments of this disclosure may be used in a new generation of table-top particle accelerators though plasma wakefield acceleration. Certain embodiments of this disclosure may be used in a new generation of miniature X-ray sources, table-top sources of X-rays for medical imaging/diagnostics. Certain embodiments of this disclosure may be used for high-energy delivery in the atmosphere: low atmospheric losses at wavelengths between, e.g., about 8 μm and 14 μm provide an opportunity to exploit self-guided pulses via filamentation over kilometer distances without losing intensity through absorption or diffraction. Laboratories doing attosecond and high-field physics.

Certain embodiments can include one or more control modules for controlling the delay assembly and/or the optical input device (e.g., a laser). One or more feedback systems having one or more sensors and/or feedback modules operatively connected to the one or more control modules can be implemented as well for controlling inputs to result in a desired output optical signal.

Embodiments can include any suitable computer hardware and/or software module(s) to perform any suitable function (e.g., as disclosed herein). Any suitable method(s) or portion(s) thereof disclosed herein can be performed on and/or by any suitable hardware and/or software module(s). Any suitable method(s) and/or portion(s) thereof disclosed herein can be embodied as computer executable instructions stored on a non-transitory computer readable medium, for example.

As will be appreciated by those skilled in the art, aspects of this disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of this disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system comprising:

a beamsplitter configured to be in optical communication with an optical input source configured to generate one or more input optical signals, the beamsplitter configured to split the one or more input optical signals into:

one or more seed optical signals configured to propagate along a first optical path; and one or more pump optical signals configured to propagate along a second optical path;

a frequency divider in optical communication with the beamsplitter to receive the one or more seed optical signals, the frequency divider configured to divide optical frequencies of the one or more seed optical signals in half to provide one or more subharmonic seed optical signals;

a beam combiner in optical communication with the frequency divider to receive the one or more subharmonic seed optical signals, and with the beamsplitter to receive the one or more pump optical signals, wherein the beam combiner is configured to combine at least one of the one or more pump optical signals and at least one of the one or more subharmonic seed optical signals to provide a combined optical signal; and a nonlinear material in optical communication with the beam combiner to receive the combined optical signal, wherein the nonlinear material is configured to provide optical parametric amplification of the at least one of the one or more subharmonic seed optical signals of the combined optical signal.

2. The system of claim 1, wherein the frequency divider is or includes a subharmonic optical parametric oscillator configured to output the one or more seed subharmonic optical signals.

3. The system of claim 2, wherein the input optical source is or includes a femtosecond laser oscillator.

4. The system of claim 3, further comprising an amplifier in optical communication with the beamsplitter to receive the one or more pump optical signals and configured to amplify the one or more pump optical signals upstream of the beam combiner.

5. The system of claim 4, wherein the amplifier is or includes an optical parametric chirped-pulse amplifier (OPCPA).

6. The system of claim 4, further comprising a pulse picker between the beamsplitter and the amplifier, the pulse picker configured to select at least one of the one or more pump optical signals for amplification.

7. The system of claim 2, wherein the frequency divider is or includes a subharmonic optical parametric generator (OPG) to provide the one or more seed subharmonic optical signals.

8. The system of claim 1, wherein the input optical source is or includes a femtosecond laser amplifier with carrier envelope phase (CEP) stabilization.

9. The system of claim 1, further comprising a chirped pulse amplifier between the input optical source and the beamsplitter such that the one or more input optical signals are chirped upstream of the beamsplitter.

10. The system of claim 1, wherein the nonlinear material is or includes a nonlinear crystal.

11. The system of claim 1, wherein the nonlinear material is or includes at least one of a periodically-poled oxide, a birefringent crystal, an orientation-patterned cubic crystal, or an orientation-patterned hexagonal crystal.

12. The system of claim 1, further comprising an amplifier prior to the beamsplitter to amplify the one or more input optical signals.

13. The system of claim 1, further comprising the input optical source.

14. The system of claim 13, wherein the input optical source is a laser source configured to output laser light.

15. A method comprising:

splitting one or more input optical signals of laser light into one or more seed optical signals propagating along a first path and one or more pump optical signals propagating along a second path;

dividing optical frequencies of the one or more seed optical signals in half to provide one or more subharmonic seed optical signals; and combining at least one of the one or more pump optical signals and at least one of the one or more subharmonic seed optical signals in a nonlinear crystal, wherein the nonlinear crystal provides optical parametric amplification of the at least one of the one or more subharmonic seed optical signals.

16. The method of claim 15, wherein dividing includes dividing the optical frequencies with a subharmonic optical parametric oscillator.

17. The method of claim 16, further comprising amplifying the at least one of the one or more pump optical signals upstream of the beam combiner.

18. The method of claim 17, wherein amplifying includes amplifying the at least one of the one or more pump optical signals upstream of the beam combiner with an optical parametric chirped-pulse amplifier (OPCPA).

19. The method of claim 15, wherein dividing includes dividing the optical frequencies of the one or more seed optical signals with an additional nonlinear crystal configured as a subharmonic optical parametric generator.

20. The method of claim 15, further comprising chirping the one or more input optical signals and/or amplifying the one or more input optical signals upstream of the beamsplitter.

* * * * *